United States Patent
Fischer et al.

[11] Patent Number: 6,116,647
[45] Date of Patent: Sep. 12, 2000

[54] STEERING COLUMN IN A MOTOR VEHICLE

[75] Inventors: Thomas Fischer, Calw; Martin Ganser, Weil der Stadt; Ulrich Schick, Nagold-Vollmaringen, all of Germany

[73] Assignee: Micro Compact Car AG, Biel, Switzerland

[21] Appl. No.: 09/114,571

[22] Filed: Jul. 13, 1998

[30] Foreign Application Priority Data

Jul. 12, 1997 [DE] Germany .......................... 197 29 893

[51] Int. Cl.⁷ ...................................................... B62D 1/19
[52] U.S. Cl. ............................................ 280/777; 280/750
[58] Field of Search ................................ 280/777, 750; 74/492; 188/371, 376

[56] References Cited

U.S. PATENT DOCUMENTS

| | | | |
|---|---|---|---|
| 4,009,622 | 3/1977 | Hinderks | 280/777 |
| 4,397,480 | 8/1983 | Ouchi | 280/777 |
| 4,411,331 | 10/1983 | Hanada . | |
| 4,951,522 | 8/1990 | Chowdhury et al. | 280/777 |
| 5,005,863 | 4/1991 | Drefahl | 280/777 |
| 5,067,747 | 11/1991 | Yokoyama . | |
| 5,082,311 | 1/1992 | Melotik | 280/777 |
| 5,685,564 | 11/1997 | Iijima et al. | 280/777 |

FOREIGN PATENT DOCUMENTS

| | | | |
|---|---|---|---|
| 1134299 | 8/1962 | Germany | 280/777 |
| 31 28 785 A1 | 4/1982 | Germany . | |
| 31 36 812 C2 | 4/1985 | Germany . | |
| 31 27 172 C2 | 9/1989 | Germany . | |
| 3-5677 | 1/1991 | Japan . | |
| 2 084 522 | 4/1982 | United Kingdom . | |

*Primary Examiner*—J. J. Swann
*Assistant Examiner*—Michael Cuff
*Attorney, Agent, or Firm*—Evenson, McKeown, Edwards & Lenahan, P.L.L.C.

[57] ABSTRACT

A steering column in a motor vehicle having a steering shaft which, in the event of a crash, can be displaced axially in the direction of the vehicle front by a load on the steering wheel. The steering column has a shell element around the steering shaft adjoining the steering wheel which can be divided by the displacement of the steering wheel for reducing the displacement resistance. The shell element is divided into at least two parts approximately in the axial direction of the steering shaft. The steering wheel and the steering shaft press the shell parts of the shell element apart radially to the outside in the event of an axial displacement.

11 Claims, 3 Drawing Sheets

STEERING COLUMN IN A MOTOR VEHICLE

BACKGROUND AND SUMMARY OF THE INVENTION

This application claims the priority of 197 29 893.1, filed Jul. 12, 1997, the disclosure of which is expressly incorporated by reference herein.

The present invention relates to a steering column in a motor vehicle, and more particularly, to a steering column having a steering shaft which, in the event of a crash, by a load on the steering wheel can be axially displaced in the direction of the vehicle front and which, adjoining the steering wheel, is surrounded by a shell element which can be divided by the displacement of the steering wheel for reducing the displacement resistance.

DE 31 28 785 A1 shows a steering column whose steering shaft is surrounded in its upper area adjoining the steering wheel by a shell-shaped casing. In the event of a crash and a resulting displacement of the steering wheel and of the steering shaft in the direction of the vehicle front because of the driver's impact, the dashboard is broken in order to reduce its resistance to the displacement of the steering shaft with the casing. Furthermore, it is known that, during the displacement of the steering wheel and of the steering shaft, the shell-shaped casing breaks apart in an uncontrolled manner.

Furthermore, DE 31 27 172 describes weakened areas in a dashboard in which the dashboard deforms in the event of the vehicle occupant's impact or in which the instrument panel breaks. In this arrangement, the weakened areas are to be formed by a thinner cross-section or by slots penetrating the material.

SUMMARY OF THE INVENTION

An object of the present invention is to construct a steering column such that, in the event of a crash-caused displacement of the steering wheel in the direction of the vehicle front, an early block formation by the casing of the steering shaft can be avoided.

The object has been achieved in accordance with the present invention by providing that the shell element is divided at least into two parts approximately in the axial direction of the steering shaft, and in that the steering wheel and the steering shaft press the shell parts and of the shell element apart radially to the outside during the axial displacement.

In a steering column in a motor vehicle, the steering shaft is surrounded in the area adjoining the steering wheel by a shell element. Because of the loading of the steering wheel by the driver in a crash, the steering shaft is axially displaceable in the direction of the vehicle front, the shell element is constructed to be divided at least in two parts approximately in the axial direction of the steering shaft to reduce the displacing resistance, and the steering wheel or the steering shaft will then press the shell parts of the shell element apart radially to the outside in a targeted manner during the axial displacement. In order to achieve this, at least one shell part may have an ascending deflecting bevel which is acted upon during the axial displacement by an extension on the steering wheel or on the steering shaft.

One shell part can be used as a covering part for the steering shaft and the other shell part can form a bearing shell for the steering shaft as well as a holding shell for the bearing of operating lever switches of for the bearing of another covering part which is constructed in one piece at reasonable cost and, when acted upon by the steering wheel or by the steering shaft, can also be ripped open in a prefabricated weakened area between the bearing shell and the holding shell for reducing the displacement resistance.

The extension, which acts upon a deflecting bevel, can be constructed at reasonable cost in one piece on the stator of the contact unit on the steering wheel, and, in addition, the stator can be held in a non-rotatable manner by fixing pins molded to the shell part.

In order to ensure that the shell parts around the steering shaft remain fixedly connected during the normal driving operation, but can definitely be pressed apart in the event of a crash, these shell parts are connected by a screwed connection. The screw heads each reach behind a wall section of a shell part which, when the shell parts are pressed apart, can be broken out in a targeted manner by the pull on the screw. In a construction which is advantageous with respect to its manufacturing, the wall sections are therefore molded on by way of webs.

Another way of reducing the displacement resistance by the shell parts consists of molding a desired breaking line into a shell part in the displacement direction of the steering wheel, along which desired breaking line, the shell part can be broken open because of a bending load exercised by the steering wheel or by the steering shaft. For this purpose, the desired breaking line can be acted upon in a bending manner by an extension assigned to the stator of the contact unit.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
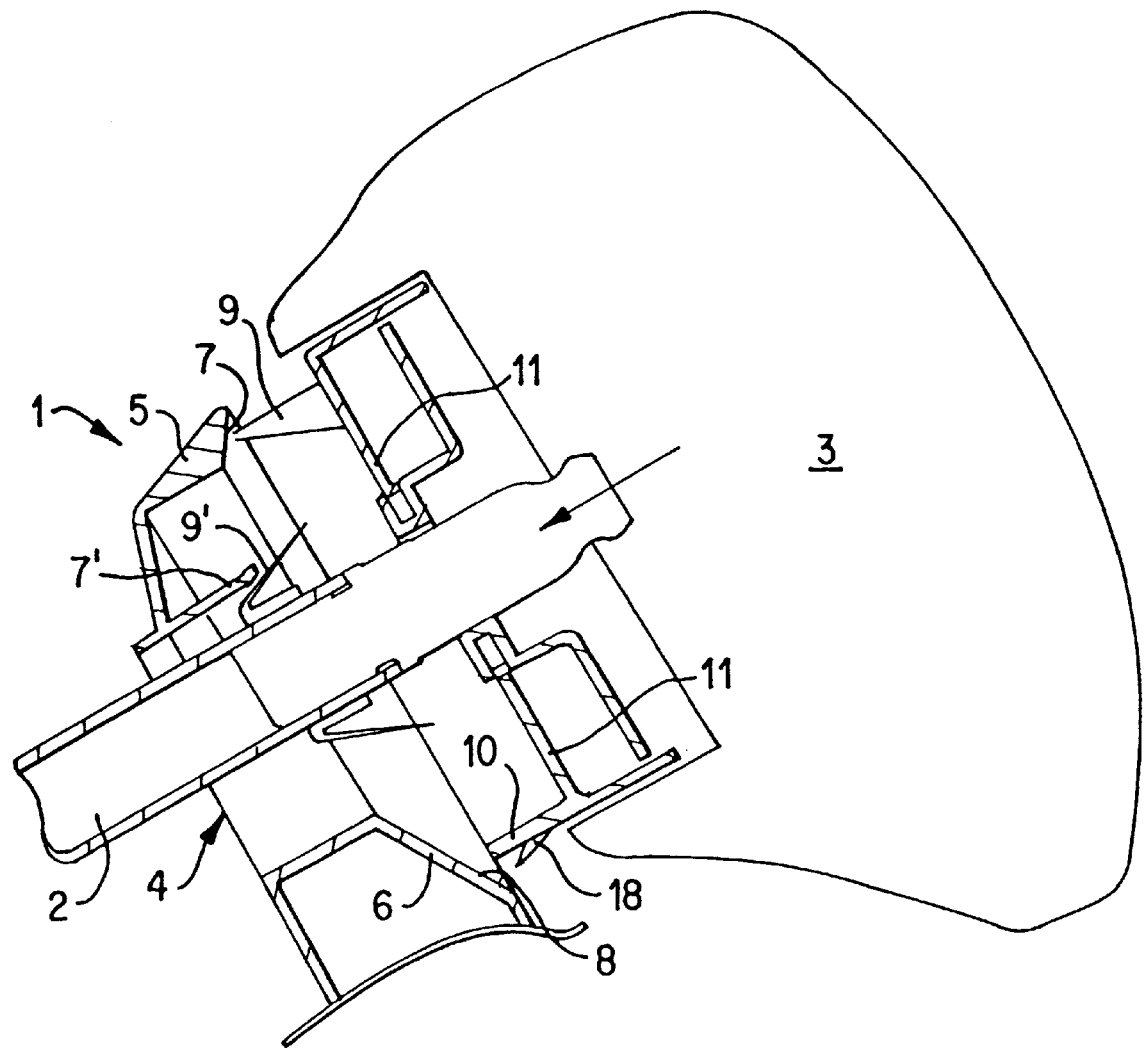
FIG. 1 is a schematic side view of a steering column according to the present invention.

FIG. 1 shows a steering column 1 for a motor vehicle, having a steering shaft 2 which, in the area adjoining the steering wheel 3, is surrounded by a two-part shell element 4. The shell element 4 can be used for covering the steering shaft 2 and as a bearing for the levers or switches arranged there, in which case it can also be used as a support for a covering part.

In the event of a vehicle crash, a driver of the motor vehicle presses in the direction of the shown arrow, directly or by way of the triggered air bag, onto the steering wheel 3 and also in the axial direction onto the steering shaft 2. As a result, the wheel 3 and shaft 2 are displaced in the direction of the vehicle front so that the steering shaft 2 with the steering wheel 3 can apply no counterforce injuring the driver.

So that also the shell element 4 does not hinder the axial displacement of the steering shaft 2 and of the steering wheel 3, the shell element 4 is constructed at least in two parts approximately in the axial direction, in which case these shell parts 5, 6 are pressed apart during their displacement radially to the outside by the steering wheel 3 and the steering shaft 2.

For this purpose, the shell part 5 which is situated on top in the motor vehicle and the shell part 6 situated on the bottom have, in their end area assigned to the steering wheel 3, one deflecting bevel 7, 8 respectively, onto which an extension 9, 10 on the stator 11 of the contact unit of the steering wheel strikes during the displacement of the steering wheel 3 and by ways of which, in a further axial displacement of the steering wheel 3, the shell parts 5, 6 are pressed away toward the outside so that they do not hinder the further displacement of the steering wheel 3 and of the steering shaft 2. A corresponding effect can be achieved by a deflecting bevel 7' on the shell part 5 which, during the displacement of the steering shaft 2, is acted upon by an extension 9' on the steering shaft.

A one-piece shaping-on of such an extension 9, 10 on the plastic-material stator 11 of the contact unit on the steering wheel can be produced at particularly reasonable cost.

Figure 2:
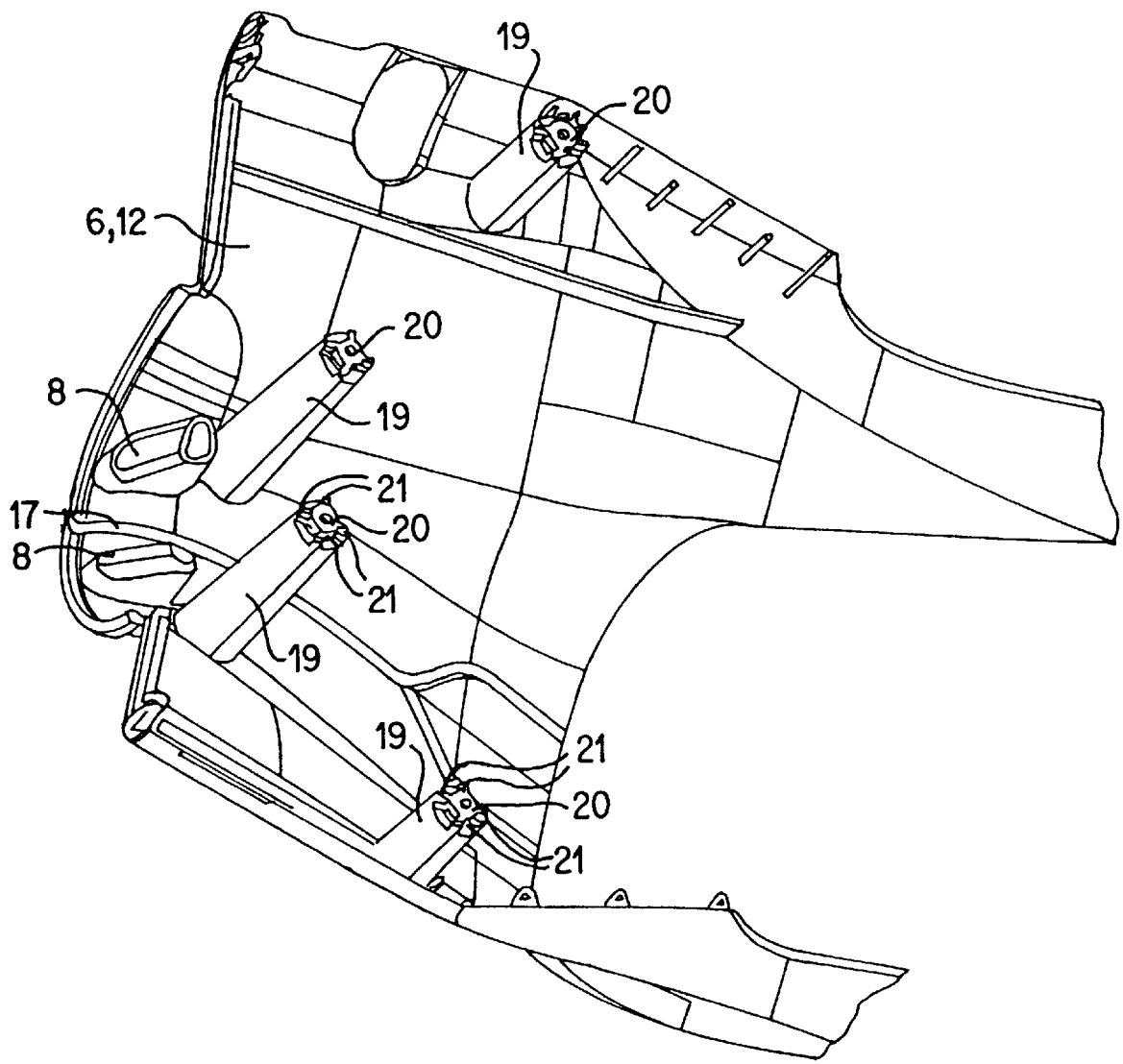
FIG. 2 is an interior perspective view of a covering part situated on the bottom which is mirror-inverted thereto.

As illustrated in FIG. 2, the lower shell part 6 is constructed as a covering part 12 which covers the steering shaft 2 in a protective manner from below to half the sides. With respect to the steering wheel 3 which adjoins on the left side in the installed condition, the covering part 12 has two deflecting bevels 8 onto which the extension 10 on the steering wheel stator 11 can strike in the event of a crash-caused displacement of the steering wheel 3 in the direction of the arrow, whereby the covering part 12 is pressed away in the downward direction.

Figure 3:
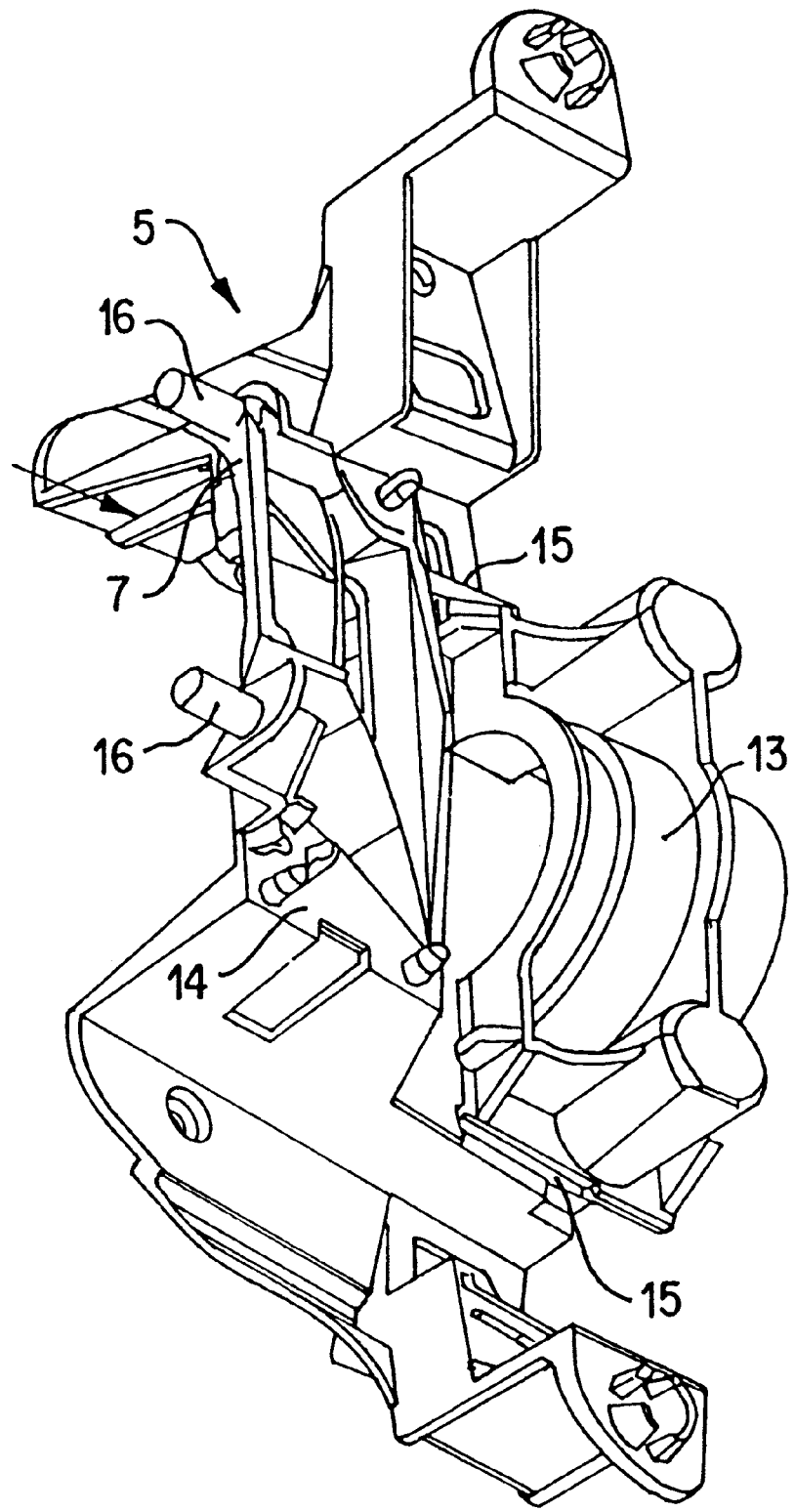
FIG. 3 is an exterior perspective view of a holding shell and bearing shell situated on top.

The shell part 5 situated on top comprises, as illustrated in FIG. 3, a bearing shell 13 for the steering shaft 2 and a holding shell 14 for the bearing of operating lever switches, such as turn signal levers and window wiper switching levers, and optionally, for the bearing of covering parts. These shells 13, 14 enclose the other half of the steering shaft 2 from above to the covering part 12. The bearing shell 13 and the holding shell 14 are produced at reasonable cost being connected in one piece with one another. During the crash-caused displacement of the steering wheel 3 in the direction of the arrow, the upper extension 9 on the stator 11 of the contact unit strikes onto the deflecting bevel 7 on the holding shell 14 and presses the holding shell 14 upwards. In the process, the holding shell 14 breaks off the bearing shell 13 in a preformed, linear weakened area 15, and the bearing shell 13 still surrounds the steering shaft 2.

Fixing pins 16 are also molded to the holding shell 14 and correspond with receiving devices on the stator 11 of the contact unit on the steering wheel for holding the stator 11 in a non-rotatable manner. This connection is disengaged by the displacement of the steering wheel 3 and of the steering shaft 2.

Furthermore, the covering part 12 in FIG. 2 has a desired breaking line 17 in the displacement direction of the steering wheel 3, along which the covering part 12 can be broken open because of a bending load by the steering wheel 3 and the steering shaft 2. Another extension 18 on the steering wheel stator 11 can exercise this bending load so that the covering part 12 is, in addition, opened up into two halves and does not hinder the crash-caused displacement of the steering wheel 3 even in the event of a further displacement.

The shell parts 5, 6 are connected with one another by a screwed connection. For this purpose, the covering part 12 has domes 19 molded onto its wall, into which domes one screw (not shown), respectively, is inserted from below to connect the covering part 12 with the holding shell 14 and, in the lateral domes, also with the dashboard. In this embodiment, the wall section 20 at the end of each dome 19, on which the screw head rests from below, has the special characteristic that it is molded by way of webs 21 to the dome 19 of the covering part 12. The webs 21, during the pressing-apart of the shell parts 5, 6, are broken out during the crash-caused displacement of the steering wheel so that the connection will no longer exist and the pressing-apart of the shell parts 5, 6 is not hindered.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Steering column in a motor vehicle, comprising a steering shaft which, in the event of a crash, by a load on a steering wheel is configured to be axially displaced in a direction of the vehicle front and which, adjoining the steering wheel, is surrounded by a shell element configured to be divided by displacement of the steering wheel for reducing displacement resistance, wherein the shell element is divided at least into two shell parts approximately in an axial direction of the steering shaft and the steering wheel and the steering shaft are operatively arranged to press the shell parts of the shell element apart radially to the outside during axial displacement.

2. Steering column according to claim 1, wherein at least one of the shell parts has a deflecting bevel configured to be acted upon by a member on the steering wheel or on the steering shaft during the axial displacement.

3. Steering column according to claim 1, wherein one shell part comprises a covering part for the steering shaft.

4. Steering column according to claim 1, wherein, as one of the shell parts, a bearing shell for the steering shaft and a holding shell for the bearing of operating lever switches are connected in one piece.

5. Steering column according to claim 4, wherein, when the shell part is acted upon, the bearing shell and the holding shell are separable from one another in a prefabricated weakened area.

6. Steering column according to claim 2, wherein the extension is operatively arranged on a stator of the contact unit of the steering wheel.

7. Steering column according to claim 6, wherein, for each deflecting bevel on a shell part, an extension is molded to the stator of the contact unit of the steering wheel.

8. Steering column according to claim 1, wherein the shell parts are screw connected with screw heads reaching behind a wall section one of the shell parts, and, when the shell parts are pressed apart, the wall is predeterminedly breakable due to a weakened portion of the material.

9. Steering column according to claim 8, wherein the wall section for supporting the screw head is fixed one of the shell parts by webs.

10. Steering column according to claim 1, wherein at least one shell part has a desired breaking line in the displacement direction of the steering wheel, along which the at least one shell part is breakable open because of a bending load by the steering wheel and by the steering shaft.

11. Steering column according to claim 10, wherein the desired breaking line is acted upon in a bending manner by an extension assigned to the stator of the contact unit of the steering wheel.

\* \* \* \* \*